Sept. 9, 1924.

E. E. HOLT

VALVE AND THE LIKE

Filed July 15, 1922

1,508,102

Inventor
Edward E. Holt.
by Dewey & Dewey
Attys.

Patented Sept. 9, 1924.

1,508,102

UNITED STATES PATENT OFFICE.

EDWARD E. HOLT, OF CHICAGO, ILLINOIS, ASSIGNOR TO HOLT AUTO DEVICES COMPANY, OF CHICAGO, ILLINOIS, A CORPORATION OF ILLINOIS.

VALVE AND THE LIKE.

Application filed July 15, 1922. Serial No. 575,424.

*To all whom it may concern:*

Be it known that I, EDWARD E. HOLT, a citizen of the United States, residing at Chicago, in the county of Cook and State of Illinois, have invented certain new and useful Improvements in Valves and the like, of which the following is a specification.

This invention has to do particularly with certain improvements in the construction of valves and the like. The invention has reference particularly to improvements in construction of such valves as water faucets, etc., but it will presently appear that the features of the invention and their usefulness are not limited to water valves or valves for any other particular use. Nevertheless, owing to the fact that the construction herein disclosed is very well adapted for use in water valves or faucets, I have illustrated the present invention as being particularly applied to this class of use. It will be understood, however, that in so illustrating and describing the invention, I do not intend to limit the same to use in water faucets and the like except as I may do so in the claims.

One of the objects of the invention is to provide a valve of such construction and arrangement that a very perfect seal may be secured between the valve and its seat so as to absolutely shut off the fluid flow when the valve is closed. Another object in this connection is to secure this result by means of a metal to metal contact, both the valve and seat being made of metal. Owing to this fact, the useful life of the valve will be greatly increased, since the wear will be largely reduced as compared to those valves in which one of the elements is of composition.

Another object of the invention is to provide an arrangement such that when a relatively small pressure is exerted on the handle, a pressure will be exerted between the valve and its seat, sufficient to effectively close the opening in an absolutely tight manner. In this connection, a further object is to accomplish this result by the use of a tapered valve working into a tapered seat.

A still further object of the invention is to provide an arrangement such that the valve itself shall have a relatively thin and flexible contacting edge to take into the seat, both the seat and the valve being tapered or cone shaped, so that the aforementioned wedging action is secured in conjunction with the feature of a relatively flexible contacting edge in order to insure a tight contact all the way around the valve notwithstanding slight irregularities in manufacture, and also notwithstanding the fact that both the valve and seat are made of metal.

A further object of the invention is to provide a construction such that the valve plug will be removable with respect to the stem, so that the plug itself may be easily removed or replaced without having to replace unnecessary parts.

A further object of the invention is to provide an arrangement such that the valve plug will always be accurately guided in its movements with respect to the seat, so that its contacting edge will always take properly into the seat in wedging fashion, and without the possibility of jamming the lower edge of the valve plug against parts other than the valve seat itself.

Other objects of the invention will appear from a detailed description of the same, which consists in the features of construction and combinations of parts hereinafter described and claimed.

Figure 1:
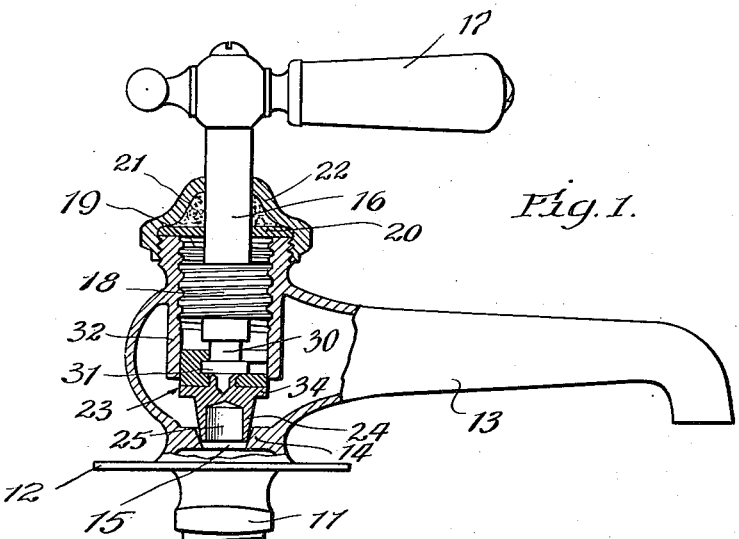
Figure 1 shows a side elevation of a water faucet embodying the features of the present invention, the same being shown partly in section in order to reveal the interior construction of the device.
Figure 3:
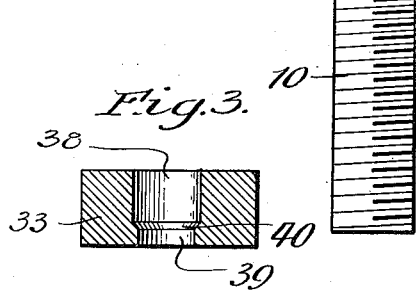
Fig. 3 shows a vertical section through the brass block, when said block has been drilled, and is a section taken on the line 3—3 of Fig. 4, looking in the direction of the arrows.
Figure 2:
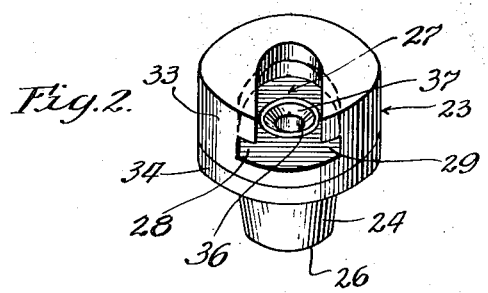
Fig. 2 shows a perspective view of the valve plug on enlarged scale.
Figure 4:
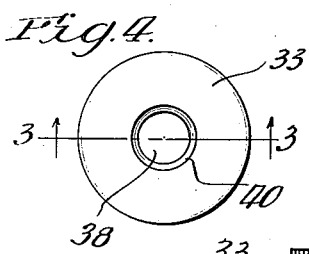
Fig. 4 shows a plan view corresponding to Fig. 3.

In the particular construction of valve illustrated in the drawing, there is provided a vertical stem 10 for attachment to a water pipe, the upper portion 11 of the same being rectangular or non-circular for insertion into the hole of the marble or composition support. This valve or faucet is also provided with a circular flange 12 adapted to rest on the top surface of the marble or composition block. It is also provided with an outwardly extending spout 13 through which the water is discharged.

Intermediate between the water supply connection 10 and the spout 13 is a horizontal partition 14 which is provided with a central passage 15 which tapers from top to bottom, so that as the plug is forced into it a wedging action takes place. Upon opening the passage or port 15 the water is allowed to pass through the spout.

Directly above the partition 14 is a vertical stem 16 on the upper end of which is mounted the handle 17 by means of which it may be turned. The stem 16 has a threaded enlarged portion 18 which works in the vertical threaded chamber 19, so that as the handle 17 is turned the stem 16 is raised or is forced downwards. A washer 20 is provided around the stem 16 and at the upper end of the threaded chamber. A suitable backing material 21 is placed around the stem and above the washer, said backing material being clamped tightly around the stem 16 by a cap screw 22 which threads onto the outside face of the structure.

A valve plug 23 is connected to the lower end of the stem 16 and is raised and lowered thereby from and towards the valve seat 15. This plug 23 has on its lower end a circular tapered flange 24, the flange being formed by a central counter bore 25 which reaches up into the lower end of the plug. The lower edge 26 of this flange is relatively thin, so that as it is forced into the tapered valve seat 15 a strong wedging action takes place to provide a very tight seal. The lower portion of the flange is preferably made sufficiently thin or flexible to allow a slight amount of deflection to take place when wedged into the tapered seat 15, so that the lower sealing edge of the plug will come into firm close engagement with the seat all the way around the same.

It is also preferred that the taper of the seat 15 be made at a slightly greater angle than the taper of the flange 24 so as to insure that the primary contact between the flange and the seat shall always be at the lower edge of the flange.

The plug 23 is connected to the lower end of the stem 16 in any convenient manner, or in some cases is made rigid or integral with respect thereto. The preferred construction, however, is one in which the plug is adjustable with respect to the stem, so that the plug will always seat accurately without regard to the exact alignment of the stem and the valve seat 15. A further preference is that the plug be removable with respect to the stem, so that new plugs can be set into the device from time to time if needed.

The arrangement shown in the drawing complies with both of the above mentioned preferences. The plug in this instance has its upper portion slotted as shown at 27, the slot being undercut as shown at 28 and 29. The lower portion of the stem 16 is grooved as shown at 30 to provide a flange 31 which may reach into the undercut portions 28 and 29 of the slot 27. In this way the plug is connected to the stem, so that the plug and stem can turn with respect to each other, and the plug may move slightly back and forth with respect to the stem, and the plug may be easily removed from the stem when the stem and plug have been taken out of the faucet, such removal being effected by moving the plug sidewise with respect to the stem.

The fluid pressure is normally exerted from beneath and against the lower portion of the plug. When the plug is raised from the seat and the water or other fluid or air is flowing past the plug, there is a natural distorting tendency which tends to force the plug to one side or the other and thus tends to destroy the alignment of the plug with respect to the seat. This tendency is greatly aggravated in the case of openings of considerable size, and in the case of water or fluid pressures of substantial amount. Furthermore, in those cases in which the plug is movable with respect to the stem, the stem itself cannot be relied upon to substantially guide the plug in its movements. I have, therefore, provided an arrangement such that the plug is guided in its movements in order to retain it at all times in substantial alignment with respect to the valve seat and opening 15. In the construction illustrated, this means takes the form of a circular flange 32 reaching down into the body of the device and surrounding the lower portion of the stem 16 as well as the upper portion of the plug itself. This flange 32 is circular and of a size to receive the upper circular portion of the plug with an easy fit; but on account of the vertical dimension of the plug, the same is retained against any twisting or other movement. Furthermore, the flange 32 should reach downwardly a sufficient distance to effectively guide the plug at all times and particularly when the lower edge 26 of the plug is at or near the upper edge of the valve seat 15. On account of the vertical dimension of the flange 24 of the plug it is possible to establish the desired guiding co-operation between the flange 32 and the upper portion of the plug while at the same time allowing a very substantial clearance between the lower edge of the flange and the chamber within which the plug works so as to allow for an ample flow of water or other fluid.

The plug itself may be made of any suitable material, but it is desirable to use a material having substantial durability and also having a sufficient flexibility to establish the desired co-operation between the lower edge of the flange 24 and the valve seat. Such a material is, for example, "Monel" metal or other similar alloy, but except as called for in the claims, I do not limit myself to the use of this metal. This metal is, however, very hard to work, and, therefore, I prefer to support the flange portion of the plug, when made of Monel metal or the like, on a block of some other composition such as brass. I, therefore, illustrate the upper portion of the plug as comprising a brass block 33. The flange 24 of the plug is formed as a continuation of a relatively thin block or washer 34 having upstanding therefrom a neck 35 which is centrally recessed at 36, so that its upper edge 37 is relatively thin.

Figure 5:
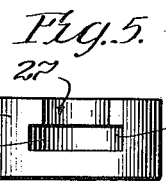
Fig. 5 shows a side elevation of the brass block after the same has been "profiled"
Figure 6:
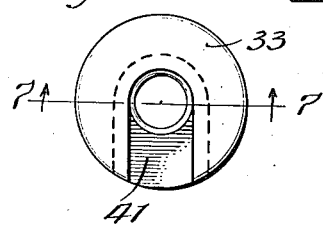
Fig. 6 shows a plan view corresponding to Fig. 5.
Figures 7, 8:
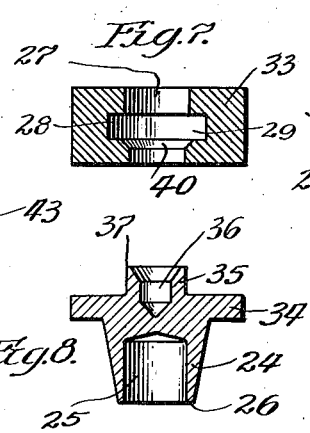
Fig. 7 shows a vertical section taken on the line 7—7 of Fig. 6, looking in the direction of the arrows.
Fig. 8 shows a vertical section through the Monel metal block.
Figure 9:
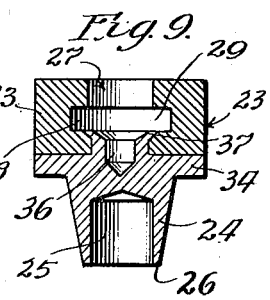
Fig. 9 shows a vertical section through the brass block and Monel metal block after they have been assembled.

The brass block 33 is initially drilled to provide an upper relatively large passage 38 in conjunction with a lower smaller passage 39, a tapered seat 40 being established at the point where these passages come together. After the brass block has been drilled in this manner, it is "profiled" in the manner shown in Figs. 5 and 6 so as to establish a transverse slot 41 reaching across the block, at least as far as the central portion thereof, the sides of said slot 41 being undercut as shown at 42 and 43. The Monel metal flange portion then has its lip 35 set up into the smaller opening 39 of the brass block and the upper edge 37 is then spun out against the taper 40 of the brass block as shown in Fig. 9, so that the two elements of the block are rigidly and permanently fastened together.

I wish to state that although I have herein disclosed and described in detail a particular construction of plug, a portion of which is made of Monel metal, nevertheless, I do not claim this construction of plug in this application, except in some cases in combination, since I have also disclosed this general form and construction of plug in a copending application for Letters Patent of the United States executed by me of even date herewith.

While I have herein shown and described only a single embodiment of the features of my present invention, still I do not limit myself to the same except as I may do so in the claims.

I claim:

1. A faucet comprising in combination a vertical water connection, a chamber above the same, a horizontally extending spout in connection with said chamber, a horizontal partition between the vertical connection and the chamber, a central circular port in said partition, said port having a valve seat tapering from the chamber to the water connection, a circular guide depending downwards within the chamber above the position of said port and terminating substantially above the position of the partition to permit a free flow of water to the spout, a stem extending upwardly from the chamber, an operating handle thereon, said stem being screw threaded with respect to the upper portion of the chamber whereby rotation of the stem raises or lowers it, and a valve plug in conjunction with the lower end of said stem and operable thereby towards and from the valve seat aforesaid, said plug including an upper cylindrical portion working within the circular guide and guided thereby, a swivel connection between the upper portion of the plug and the stem, and a circular tapered flange on the lower end of the plug adapted to wedge into and seal against the tapered valve seat aforesaid when the stem is forced downwards, substantially as described.

2. A faucet comprising in combination a vertical water connection, a chamber above the same, a horizontally extending spout in connection with said chamber, a horizontal partition between the vertical connection and the chamber, a central circular port in said partition, said port having a valve seat tapering from the chamber to the water connection, a circular guide depending downwards within the chamber above the position of said port and terminating substantially above the position of the partition to permit a free flow of water to the spout, a stem extending upwardly from the chamber, an operating handle thereon, means for raising and lowering said stem by the use of said handle, and a valve plug in conjunction with the lower end of the stem and operable thereby towards and from the valve seat aforesaid, said plug including an upper cylindrical portion working within the circular guide and guided thereby, a swivel connection between the upper portion of the plug and the stem, and a circular tapered flange on the lower end of the plug adapted to wedge into and seal against the tapered valve seat aforesaid when the stem is forced downwards, substantially as described.

3. A faucet comprising in combination a vertical water connection, a chamber above the same, a horizontally extending spout in connection with said chamber, a horizontal partitition between the vertical connection and the chamber, a central circular port in said partition, said port having a valve seat tapering from the chamber to the water connection, a stem extending upwardly from the chamber, an operating handle thereon, means whereby said stem may be raised and lowered by use of said handle, and a valve plug in conjunction with the lower end of said stem and operable thereby towards and from the valve seat aforesaid, said plug including a circular tapered flange on its lower end adapted to wedge into and seal against the tapered valve seat aforesaid when the stem is forced downwards, and a swivel connection between the plug and the stem, substantially as described.

4. A faucet comprising in combination a vertical water connection, a horizontally extending spout in conjunction with said connection, a horizontal partition between the connection and the spout, a central circular port in said partition, said port having a vertical seat tapering towards the water connection, a vertical stem above the port, an operating handle thereon, means whereby said stem may be raised and lowered by use of said handle, and a valve plug in conjunction with the lower end of said stem and operable thereby towards and from the valve seat aforesaid, said plug including a circular tapered flange on its lower end adapted to wedge into and seal against the tapered valve seat aforesaid when the stem is forced downwards, and a swivel connection between the plug and stem, substantially as described.

5. In a valve the combination of a fluid delivery connection, a fluid discharge element, a partition between the connection and said discharge element, a circular port in said partition, said port tapering in the direction of the connection, an operating stem in line with the port, means for raising and lowering said stem with respect to the port, a valve plug swivelly mounted on the lower end of the stem, a circular tapered flange on said plug adapted to wedge into and seal against the wall of the port, and means for guiding the plug in its movements towards and from the port to thereby maintain the flange in proper alignment with the wall of the port, substantially as described.

6. In a valve the combination of a fluid delivery connection, a fluid discharge element, a circular port between said connection and said element, an operating stem in line with the port, means for moving the stem towards and from the port, a valve plug swivelly mounted on the end of the stem, a circular tapered flange on said plug adapted to wedge into and seal against the wall of the port, and means for guiding the plug in its movements towards and from the port to thereby maintain the flange in proper alignment with the wall of the port, substantially as described.

7. In a valve the combination of a fluid delivery connection, a fluid discharge element, a circular port between said connection and said element, an operating stem in line with the port, means for moving the stem towards and from the port, a block swivelly connected to the stem, a circular tapered flange on said block adapted to wedge into and seal against the wall of the port, and means for guiding the plug in its movements towards and from the port to thereby maintain the flange in proper alignment with the wall of the port, substantially as described.

EDWARD E. HOLT.